United States Patent [19]

Takagi

[11] Patent Number: 4,984,007
[45] Date of Patent: Jan. 8, 1991

[54] EXPOSURE CONTROL APPARATUS FOR CAMERA

[75] Inventor: Tadao Takagi, Yokohama, Japan
[73] Assignee: Nikon Corporation, Tokyo, Japan
[21] Appl. No.: 259,748
[22] Filed: Oct. 19, 1988

[30] Foreign Application Priority Data

Oct. 23, 1987 [JP] Japan .................. 62-267968

[51] Int. Cl.⁵ .................... G03B 7/08; G03B 7/099
[52] U.S. Cl. ................................ 354/432; 354/478
[58] Field of Search ............ 354/478, 432, 410, 455, 354/286, 431, 433, 434, 429, 443, 444

[56] References Cited

U.S. PATENT DOCUMENTS 4,306,787 12/1981 Fukuhara et al. ............ 354/432
4,529,288 7/1985 Nakai et al. .................. 354/442
4,636,054 1/1987 Saegusa ........................ 354/432

FOREIGN PATENT DOCUMENTS 0271019 6/1988 European Pat. Off. ......... 354/410
62-86337 4/1987 Japan .

Primary Examiner—L. T. Hix
Assistant Examiner—Cassandra C. Spyrou
Attorney, Agent, or Firm—Shapiro and Shapiro

[57] ABSTRACT

A camera body to which a photographing lens storing data associated with a full-aperture value and data associated with a position of an exit pupil can be attached, includes an optical member for scattering radiation from the photographing lens, light-receiving element, and a photometric optical system for guiding the radiation from the photographing lens through the optical member toward the light-receiving element. The optical member is arranged on a side opposite to an object with respect to the photographing lens. The light-receiving element generates an output according to the radiation incident from the photometric optical system. The camera body further includes a correction circuit for reading out the data associated with the full-aperture value and the position of the exit pupil, calculating a correction amount based on the readout data, and correcting the output from the light-receiving element based on the calculated correction amount, and an exposure control circuit for performing exposure control based on the corrected output.

9 Claims, 7 Drawing Sheets

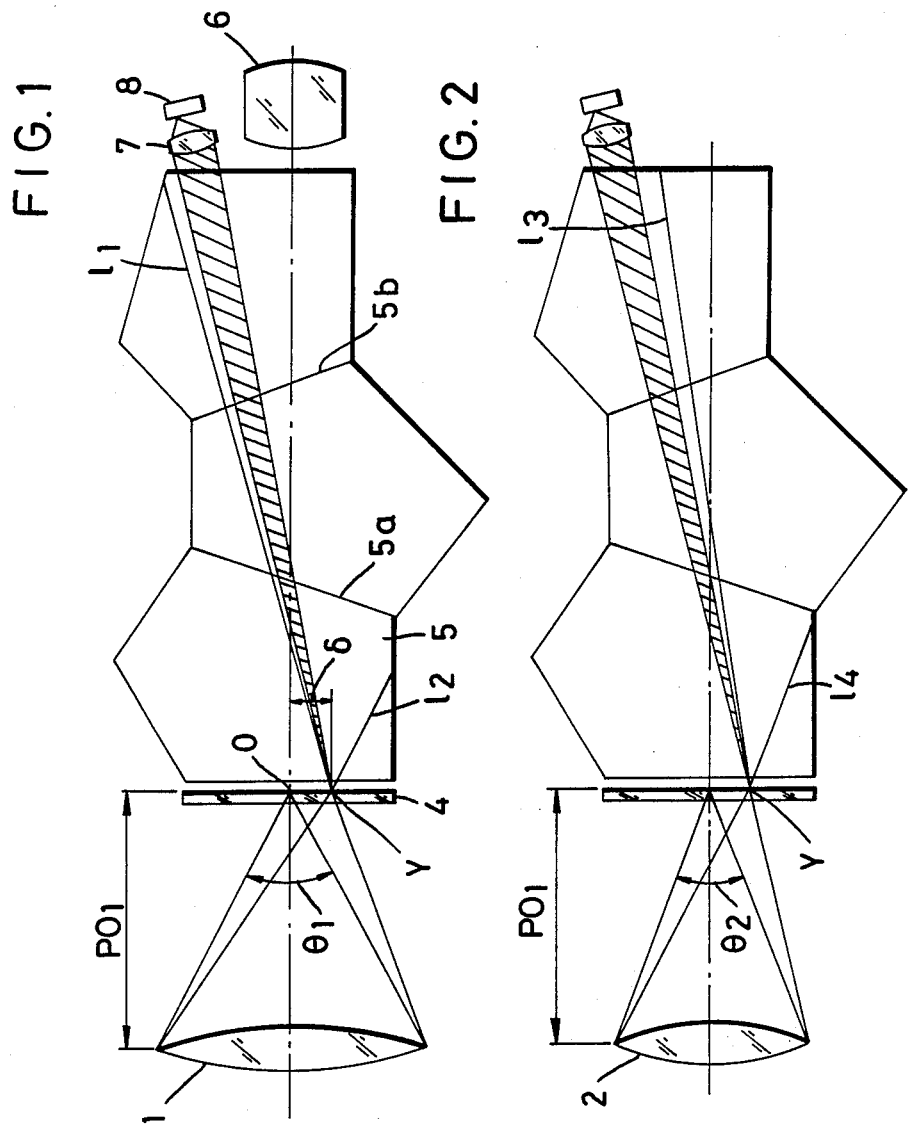

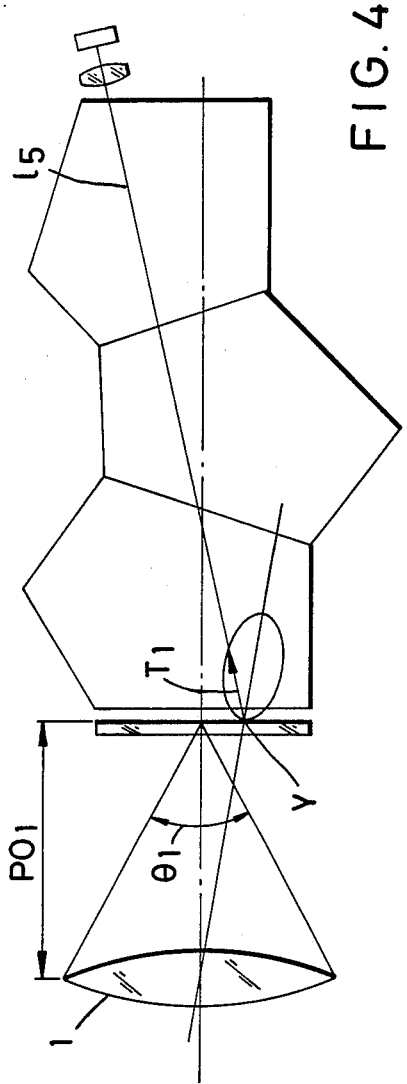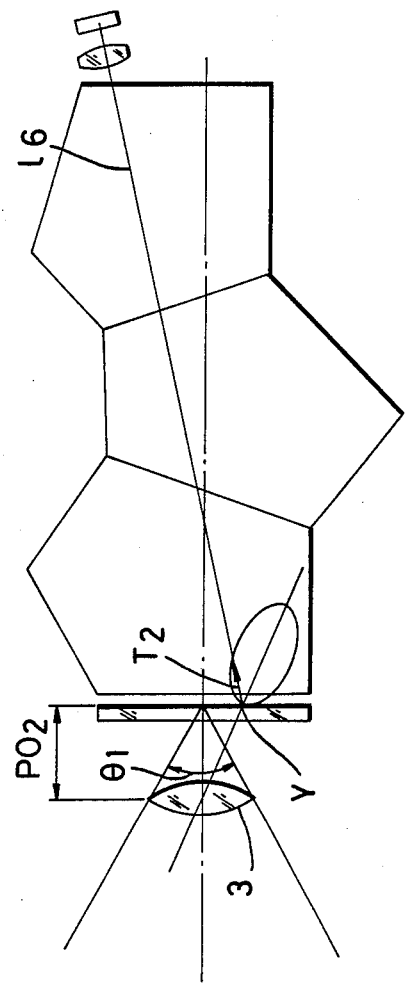

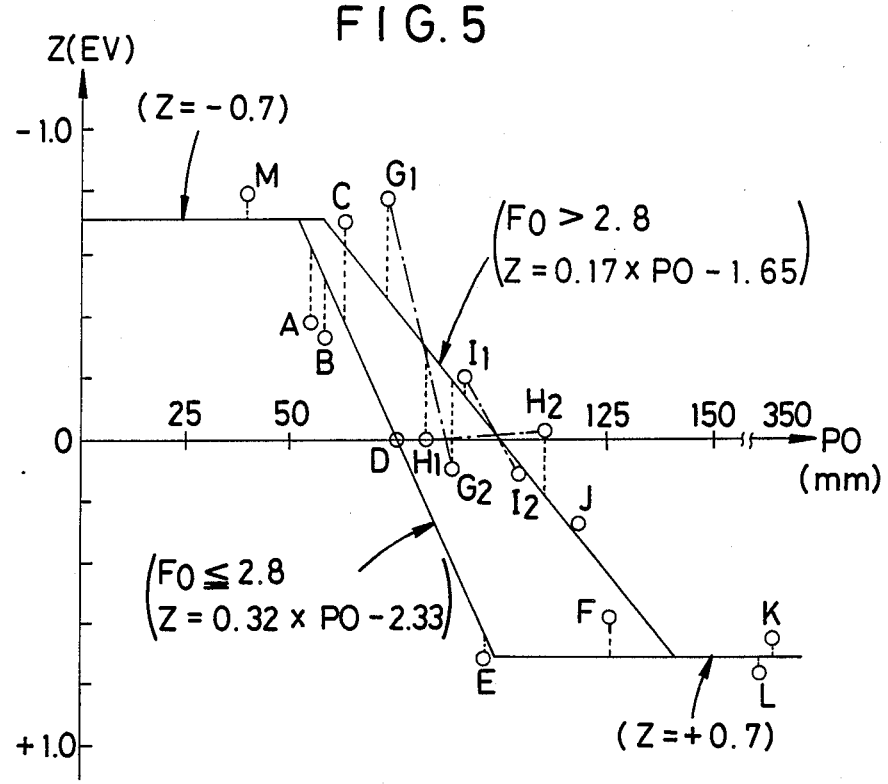

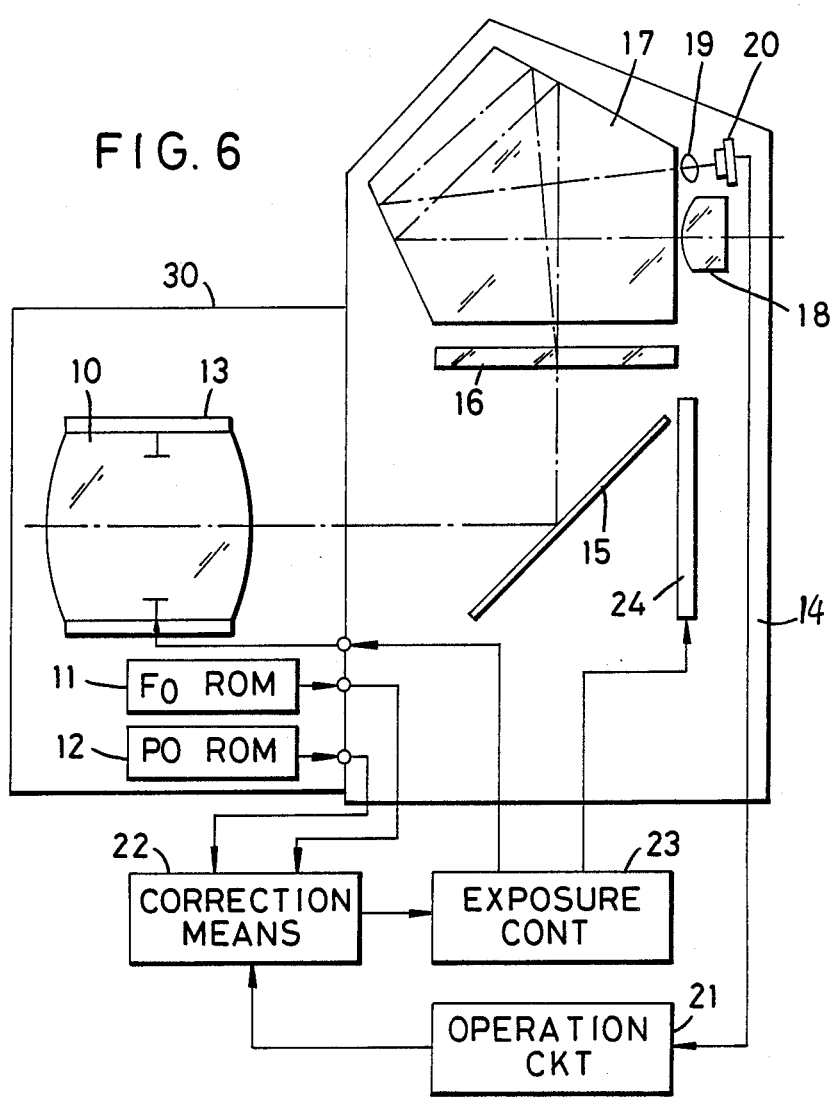

EXPOSURE CONTROL APPARATUS FOR CAMERA

BACKGROUND OF THE INVENTION

1. Field of the Invention

The present invention relates to an exposure correction apparatus for a camera.

2. Related Background Art

A conventional interchangeable lens barrel is provided with a mechanical signal portion at an engaging portion with a camera body or with a memory means such as a ROM, so that data of the interchangeable lens barrel, e.g., a full-aperture value ($F_0$) and a focal length ($f_{mm}$) are input to the camera body.

The camera body receives these data from the interchangeable lens barrel, and calculates an exposure correction amount (Z) based on the full-aperture value ($F_0$) and sometimes taking the focal length ($f_{mm}$) into consideration.

Note that the exposure correction amount (Z) is an amount for correcting errors of an output from photometry means for measuring a light beam passing through a photographing lens of an interchangeable lens barrel and brightness of an image forming surface of the photographing lens (or film surface in a silver chloride type camera) with respect to brightness of a field as an object to be photographed or measured. Each interchangeable lens barrel has the exposure correction amount as an inherent value.

In order to obtain a bright finder, a recent camera tends to have a decreased diffusion property of a finder screen, i.e., narrow directivity, and the number of kinds of lens, including zoom lenses, is increased. In this situation, an increase in absolute value of an exposure correction amount, and a considerable reduction in correlation of the exposure correction value with the full-aperture value and the focal length are caused. That is, the exposure correction amount cannot be determined by a conventional exposure operation apparatus using a full-aperture value and a focal length.

SUMMARY OF THE INVENTION

It is therefore an object of the present invention to provide an exposure operation apparatus for a camera for accurately calculating an exposure correction amount based on a full-aperture value and an exit pupil of a photographing lens.

In order to achieve the above object, according to the present invention, photographing lenses are classified into a plurality of groups in accordance with their full-aperture values, and then, an exposure correction amount is calculated based on the position of an exit pupil.

For a range where linearity cannot be obtained, an upper- or lower-limit value of an exposure correction amount is set to allow correction.

BRIEF DESCRIPTION OF THE DRAWINGS

FIGS. 1 and 2 are views showing the influence on photometry caused by a full-aperture value of a photographing lens;

FIGS. 3 and 4 are views showing the influence on photometry caused by an exit pupil distance of a photographing lens;

FIG. 5 is a graph showing an exposure correction amount according to a first embodiment of the present invention;

FIG. 6 is a diagram showing an arrangement of the first embodiment of the present invention;

DETAILED DESCRIPTION OF THE PREFERRED EMBODIMENTS

Figure 7:
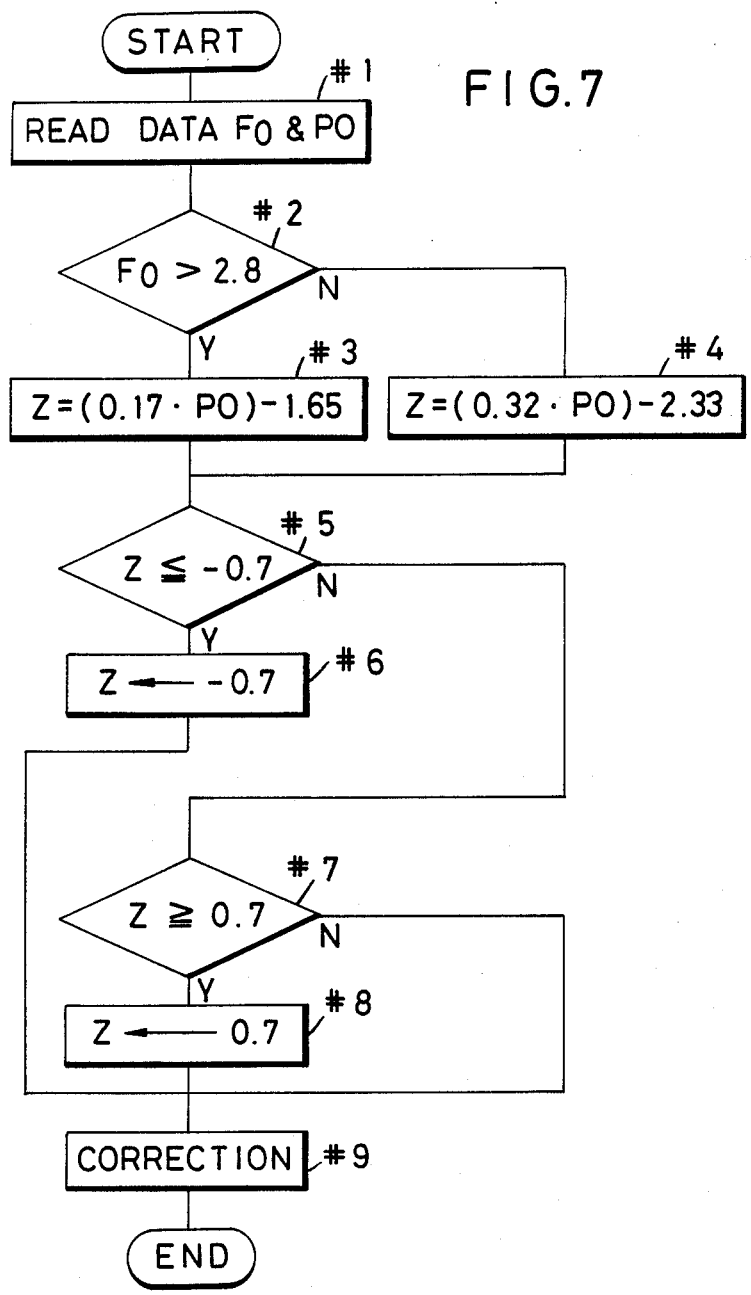
FIG. 7 is a flow chart showing some operations of the first embodiment of the present invention.

The principle of the present invention will be explained below with reference to FIGS. 1 to 4.

In FIGS. 1 to 4, a light beam passing through a photographing lens 1, 2 or 3 is focused on a finder screen 4, and an optical image on the finder screen 4 can be observed through a pentagonal prism 5 and an eyepiece lens 6. The optical image is guided to a light-receiving element 8 through the pentagonal prism 5 and a focusing lens 7. The photographing lenses 1 to 3 are illustrated at the positions of exit pupils for the illustrative convenience. The pentagonal prism 5 is shown developed at first and second reflection surfaces 5a and 5b.

The photographing lens 1 shown in FIG. 1 has an exit pupil distance $PO_1$ (an interval between the exit pupil and the finder screen), and has an angular aperture $\theta_1$. Of a light beam passing through the photographing lens 1, a light beam component reaching a point Y separated from an optical axis by $\delta$ on the finder screen 4 is considered. Since the diffusion property of the finder screen 4 is assumed to be considerably low, the light beam passing the point Y covers a fan-shaped portion between lines $l_1$ and $l_2$. A light beam received by a photometry means consisting of the focusing lens 7 and the light-receiving element 8 corresponds to the hatched portion. Since this hatched portion is included in the fan-shaped portion, an appropriate light amount can be obtained at the photometry means.

The photographing lens 2 shown in FIG. 2 has the same exit pupil distance $PO_1$ as in FIG. 1, and an angular aperture $\theta_2 (<\theta_1)$ smaller than that in FIG. 1. Therefore, a light beam passing the point Y falls within the range of a fan-shaped portion between lines $l_3$ and $l_4$, and does not overlap at all a light beam range of the hatched portion used for photometry. This means that the light beam passing the point Y does not reach the photometry means at all. In practice, since the finder screen 4 has a diffusion property, some light components passing the point Y can reach the photometry means. However, its light amount is decreased since the angular aperture is decreased as compared to FIG. 1.

As described above, if an angular aperture, i.e., a full-aperture value is changed when the exit pupil distance ($PO_1$) remains the same, the output from the light-receiving element has a non-negligible error even if a change in full-aperture value ($F_0$) is corrected, and the error tends to greatly change before and after a predetermined full-aperture value.

The photographing lens 1 shown in FIG. 3 has the angular aperture $\theta_1$ and the exit pupil distance $PO_1$. Assume that a light beam passing through the center of the photographing lens 1 reaches the point Y on the finder screen 4, and is diffused at the point Y. This diffusion distribution corresponds to an ellipse in FIG. 3, and a component $T_1$ of the light beam is used for photometry.

The photographing lens 3 shown in FIG. 4 has the angular aperture $\theta_1$ and the exit pupil distance $PO_2$ ($<PO_1$) which is smaller than that in FIG. 3. In this case, a light beam passing through the center of the photographing lens 3 and reaching the point Y is considerably deviated from the photometry means. For this reason, of diffusion light at the point Y, a component $T_2$ propagating toward the photometry means is considerably smaller than the diffusion light component $T_1$ shown in FIG. 3. This difference becomes conspicuous as the diffusion property of the finder screen 4 is lowered.

As described above, if the exit pupil distance (PO) is changed while the full-aperture value ($F_0$) remains the same, the output from the light-receiving element 8 includes an error, and the light-receiving amount of the light-receiving element 8 tends to be decreased as the exit pupil distance (PO) decreases.

Therefore, as can be apparent from the conclusions obtained in FIGS. 1 and 2 and those obtained in FIGS. 3 and 4, a photometric output is influenced by both the full-aperture value ($F_0$) and the exit pupil distance (PO). The present invention solves this problem.

Note that in the photometric optical system, a light beam passing through the finder screen is measured from a position above the eyepiece lens. The arrangement of the photometric system is not limited to this. For example, a body photometry type system may be employed wherein a sub-mirror having a diffusion property is arranged behind a main mirror of the camera body, so that a photometry operation is performed at a bottom portion of the camera body. In FIGS. 2, 3, and 4, the eyepiece lens 6 is omitted, and reference numerals of the screen 4, the pentagonal prism 5, the focusing lens 7, and the light-receiving element 8 are omitted.

FIGS. 5 and 6 show a first embodiment of the present invention, in which FIG. 5 is a graph for explaining an exposure correction amount, and FIG. 6 is a diagram for explaining a camera system.

A camera system to which the present invention is applied will be explained below with reference to FIG. 6. A light beam passing through an optical system 10 of a photographing lens 30 is reflected by a main mirror 15, and reaches a finder screen 16. Some components of the light beam pass through a pentagonal prism 17, and reach an eyepiece lens 18. The remaining components of the light beam pass through the pentagonal prism 17 to reach a focusing lens 19 and are guided to a light-receiving element 20. In FIG. 6, an operation circuit 21, a correction means 22, and an exposure controller 23 are illustrated outside a camera body 14 but are incorporated in the camera body 14 in practice. A photometric output from the light-receiving element 20 is input to the operation circuit 21. The operation circuit 21 calculates an exposure value. The output from the operation circuit 21 is input to the exposure correction means 22, and is corrected thereby based on the full-aperture value ($F_0$) and the exit pupil distance (PO). This correction will be explained later with reference to FIG. 5. Data of the full-aperture value ($F_0$) and the exit pupil distance (PO) are normally provided to an individual interchangeable lens barrel as a mechanical signal or an electrical signal of ROM data, and are read by the camera body 14. In this embodiment, a ROM 11 stores data associated with the full-aperture value, and a ROM 12 stores data associated with the exit pupil distance. The corrected exposure value is input to the exposure controller 23, and is used for controlling an aperture 13 and a shutter 24. The exposure correction means 22 includes a microcomputer.

A calculation method of the exposure correction amount by the exposure correction means 22 will be explained below with reference to FIG. 5. In FIG. 5, the exit pupil distance (PO) is plotted along the abscissa, and the exposure correction amount (Z) is plotted along the ordinate. The exposure correction amount (Z) plotted along the ordinate takes a negative (−) value above the origin, and takes a positive (+) value below the origin. The negative (−) side represents a direction along which if a photographing operation is made without correction, an overexposed photograph is obtained since the light-receiving element cannot obtain a predetermined light amount. Contrary to this, the positive (+) side represents a direction along which an underexposed photograph is obtained. More specifically, as can be seen from FIG. 4, when the exit pupil distance (PO) is decreased, the component $T_2$ (light amount) incident on the light-receiving element 8 of a light beam incident on a film surface is gradually decreased. If a photographing operation is made without correction, an overexposed photograph is obtained. In contrast to this, as can be seen from FIG. 3, when the exit pupil distance (PO) is increased, a component $T_1$ incident on the light-receiving element 8 of a light beam incident on a film surface is gradually increased. Thus, if a photographing operation is made without correction, an underexposed photograph is obtained. Therefore, in an actual calculation, correction is performed such that the exposure correction amount (Z) is subtracted from an exposure value obtained by the exposure operation circuit 21.

For calculation of the exposure correction amount (Z), photographing lenses are classified based on their full-aperture values ($F_0$) For example, in this embodiment, photographing lenses are classified into dark ones ($F_0>2.8$) and bright ones ($F_0\leq 2.8$) to have the full-aperture value $F_0=2.8$ as a boundary. Note that upon classification of the photographing lenses, they need not be classified using $F_0=2.8$ as a boundary, and other values may be used as a boundary.

Photographing lenses A to F are bright ones ($F_0\leq 2.8$), and photographing lenses G ($G_1$, $G_2$) to M are dark ones ($F_0>2.8$). The exposure correction amounts of these photographing lenses are approximately determined by the following equations. Equations (1) and (2) are experimentally obtained approximation expressions for exposure correction.

(1) The exposure correction amount of a dark photographing lens ($F_0>2.8$) is determined by:

$$Z=0.17\times PO-1.65$$

(2) The exposure correction amount of a bright photographing lens ($F_0\leq 2.8$) is determined by:

$$Z=0.32\times PO-2.33$$

Equations (1) and (2) are established when the exit pupil distance (PO) falls within first and second predetermined ranges (these ranges are experimentally determined), respectively, and a lower-limit value of the exposure correction amount in a range wherein the exit pupil distance (PO) is to small to obtain linearity is determined by:

$$Z = -0.7$$

An upper-limit value of the exposure correction amount in a range wherein the exit pupil distance (PO) is too large to obtain linearity is determined by:

$$Z = +0.7$$

In the range of the exit pupil distance wherein the linearity cannot be obtained, as can be seen from FIGS. 3 and 4, if the exit pupil distance ($PO_1$) exceeds a predetermined distance or the exit pupil distance ($PO_2$) is decreased below another predetermined distance, since a light beam component propagating from the point Y on the finder screen 4 toward the light-receiving element 8 is not largely changed, a light amount incident on the light-receiving element 8 is not largely changed. Therefore, when the exit pupil distance becomes large or small to some extent, the exposure correction amount (Z) can be constant.

"o" marks in FIG. 5 represent actually measured values of the experimentally obtained exposure correction amounts of the photographing lenses A to M. Two "o" marks connected by an alternate long and short dashed line are tele- and wide-angle-side values of a zoom lens. Therefore, the length of a dotted line extending downward from a given "o" mark to a correction line to be parallel to the ordinate represents an amount which could not be corrected after correction. Thus, as can be seen from FIG. 5, correction can be made with considerably high accuracy.

The operation of the exposure correction means 22 will be described below with reference to the flow chart shown in FIG. 7. In step #1, data associated with a full-aperture value ($F_0$) and an exit pupil distance (PO) are read out from the ROMs 11 and 12 of the photographing lens 30 attached to the camera body 14. It is checked in step #2 based on the data read out in step #1 if the full-aperture value exceeds 2.8. If the full-aperture value exceeds 2.8, the flow advances to step #3, and the exposure correction amount Z is calculated based on equation (1) described above using the data of the full-aperture value and the exit pupil distance obtained in step #1. If the full-aperture value is equal to or smaller than 2.8, the flow advances to step #4, and the exposure correction amount Z is calculated based on equation (2). It is checked in step #5 if the exposure correction amount Z calculated in step #3 or #4 is equal to or smaller than −0.7, as indicated by equation (3). If the exposure correction amount Z is equal to or smaller than −0.7, and exposure correction is performed based on this value in step #9. If N in step #5, the flow advances to step #7 to check if the exposure correction amount Z calculated in step #3 or #4 is equal to or larger than 0.7. If the exposure correction amount Z is equal to or larger than 0.7, the exposure correction amount is set to be 0.7, and the flow advances to step #9. If it is determined in step #7 that the exposure correction amount Z is smaller than 0.7, exposure correction is performed in step #9 based on the exposure correction amount Z calculated in step #3 or #4.

Figure 8:
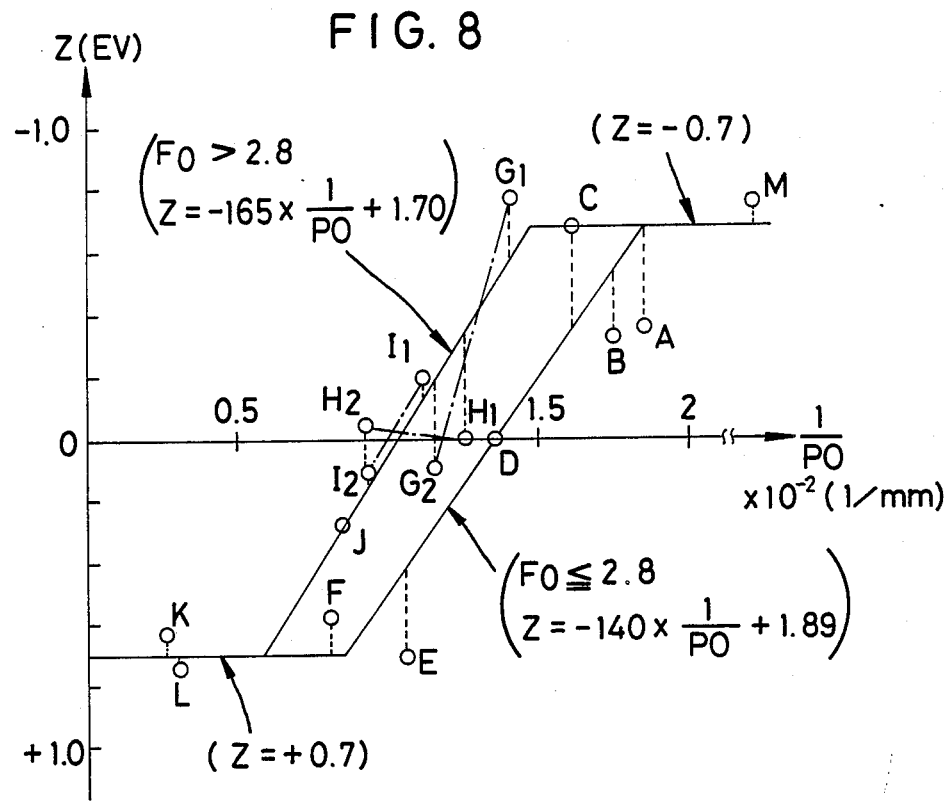
FIG. 8 is a graph showing an exposure correction amount according to a second embodiment of the present invention.

FIG. 8 shows a second embodiment of the present invention, and a difference from the first embodiment is that a reciprocal number of the exit pupil distance (1/PO) is plotted along the abscissa. Since the exit pupil distance (PO) is normally used in the form of a reciprocal number in aberration correction of an automatic focusing apparatus, the reciprocal number is preferable in view of common use of data. Exit pupil distances (PO) of most photographing lenses are distributed with the range of about 50 mm to 150 mm, i.e., a range wherein the maximum value is three times the minimum value. Therefore, linearity can be obtained if the reciprocal number is used. In a range wherein the exit pupil distance (PO) is too large or small to obtain linearity, an upper- or lower-limit value is used as in the first embodiment, and an exposure correction method using a reciprocal number of an exit pupil distance (1/PO) is allowed over a wide range.

For calculation of the exposure correction amount (Z), photographing lenses are classified based on their full-aperture values ($F_0$). That is, the photographing lenses are classified into dark photographing lenses ($F_0 \leq 2.8$) and bright photographing lenses ($F_0 = 2.8$) to have the full-aperture value $F_0 = 2.8$ as the boundary. Note that upon classification of the photographing lenses, $F_O = 2.8$ need not be used as a boundary, and the boundary may be another value, as a matter of course.

Photographing lenses A to F are bright ones ($F_O \leq 2.8$), and photographing lenses G ($G_1$, $G_2$) to M are dark ones ($F_0 > 2.8$). The exposure correction amounts of these photographing lenses are approximately determined based on the following equations. Equations (3) and (4) are experimentally obtained approximation expressions for exposure correction.

(3) The exposure correction amount of a dark photographing lens ($F_0 > 2.8$) is determined by:

$$Z = -165 \times (1/PO) + 1.70$$

(4) The exposure correction amount of a bright photographing lens ($F_0 \leq 2.8$) is determined by:

$$Z = -140 \times (1/PO) + 1.89$$

Equations (3) and (4) are established when the exit pupil distance (1/PO) falls within the range of first and second ranges (these ranges are experimentally obtained). respectively. The lower-limit value of the exposure correction amount falling within the range wherein the exit pupil distance (1/PO) is too small to obtain linearity is determined by:

$$Z = +0.7$$

The upper-limit value of the exposure correction amount falling within the range wherein the exit pupil distance (1/PO) is too large to obtain linearity is determined by:

$$Z = -0.7$$

"o" marks in FIG. 8 represent actually measured values of the experimentally obtained exposure correction amounts of the photographing lenses A to M. Two "o" marks connected by an alternate long and short dashed line are tele- and wide-angle-side values of a zoom lens. Therefore, the length of a dotted line extending downward from a given "o" mark to a correction line to be parallel to the ordinate represents an amount which could not be corrected after correction. Thus, as can be seen from FIG. 8, correction can be made with considerably high accuracy.

In the operation of the correction means 22 in the second embodiment, step #3 in the flow chart in FIG. 7 is replaced with the calculation of expression (3) and step #4 is replaced with the calculation of expression (4).

The actually measured values presented in the first and second embodiments are varied depending on photometric optical systems and the present invention is not limited to these values. Classification based on the full-aperture values ($F_0$) is not limited to two systems having $F_0=2.8$ as a boundary (approximation expressions (1) and (2) or (3) and (4). For example, exposure correction may be made using approximation expressions of three or more systems. In this manner, as the number of categories is increased, the exposure correction amount obtained by the corresponding approximation expression can be a more appropriate value. In the first embodiment, when the exit pupil distance (PO) data is stored in the photographing lens in the form of a reciprocal number (1/PO), division is made to convert it into a form of (PO), thus posing no problem.

A modification of the embodiments of the present invention will be described hereinafter. The first and second embodiments employ only one light-receiving element. In this modification, the apparatus of the present invention is applied to a camera wherein a plurality of light-receiving elements are arranged in order to perform a photometric operation while dividing an object into a plurality of regions, as described in U.S. Pat. No. 4,636,054.

Figure 9:
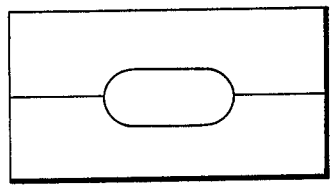
FIG. 9 is a view for explaining the principle of a modification of the present invention.
Figure 10:
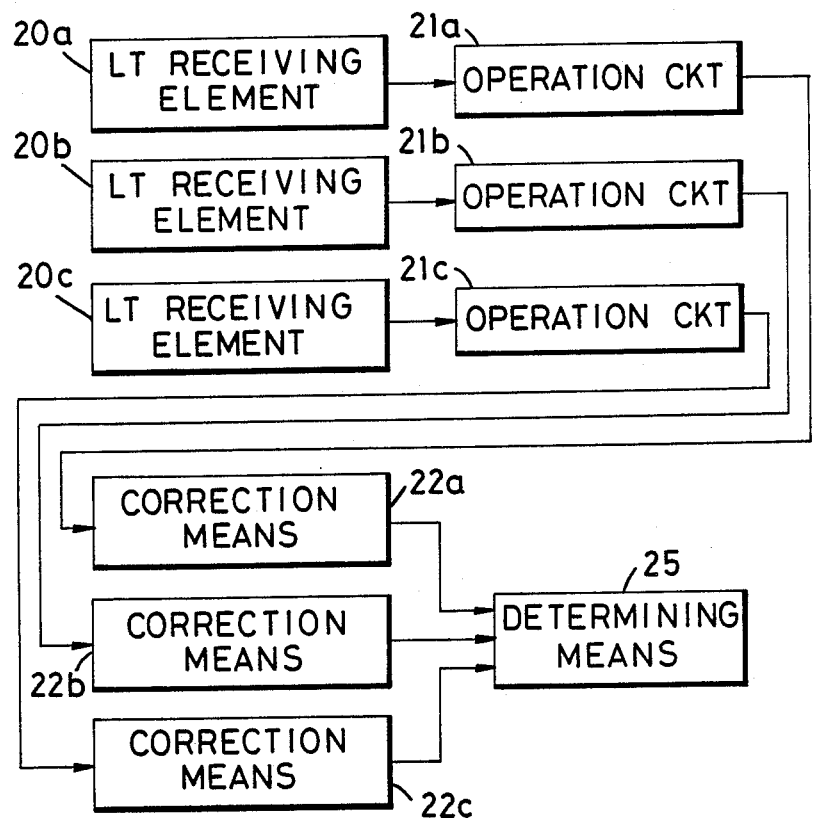
FIG. 10 is a block diagram showing an arrangement of the modification of the present invention.

As shown in FIGS. 1 to 4, when a light-receiving element is arranged behind a pentagonal prism with respect to an object, the influences of a full-aperture value and an exit pupil distance are varied depending on the position of the light-receiving element. Therefore, when a plurality of light-receiving elements are arranged behind the pentagonal prism and an object is divided into a plurality of regions shown in FIG. 9 to perform a photometric operation for each region, correction operations for exposure values according to the outputs from the light-receiving elements may be different from each other. Therefore, the arrangement of the modification of the present invention is as shown in FIG. 10.

A plurality of light-receiving elements 20a, 20b, and 20c receive light beams from different regions (corresponding to the plurality of regions of an object) of the finder screen 16 in FIG. 6. The outputs from these light-receiving elements are input to a plurality of operation circuits 21a, 21b, and 21c, respectively. The arrangements of each light-receiving element and operation circuit are the same as those in FIG. 6. Exposure correction means 22a, 22b, and 22c respectively perform correction operations according to the positions of the light-receiving elements corresponding to the outputs from the corresponding operation circuits based on data of the full-aperture value and the exit pupil distance of a photographing lens. Each correction means calculates a correction amount based on different functions shown in FIG. 5. A determining means 25 determines one correction value based on the outputs from the correction means 22a, 22b, and 22c, and outputs the determined value to an exposure controller 23. The determining means 25 selects one of a plurality of outputs or calculates an average value (including weighted average) of a plurality of outputs, as described in U.S. Pat. No. 4,636,054. The plurality of correction means can comprise a single microcomputer.

In the embodiments and modification of the present invention, the operation circuit calculates an exposure value (EV). However, another arrangement may be employed wherein the operation circuit calculates an object brightness value (BV), the correction means corrects the object brightness value, and an exposure amount is calculated from the corrected object brightness value.

What is claimed is:

1. A camera body to which a photographing lens storing data associated with a full-aperture value and data associated with a position of an exit pupil can be attached, including:
   (a) an optical member for scattering radiation from said photographing lens, said optical member being arranged on a side opposite to an object with respect to said photographing lens;
   (b) light-receiving means;
   (c) a photometric optical system for guiding the radiation from said photographing lens through said optical member toward said light-receiving means, said light-receiving means generating an output according to the radiation incident from said photometric optical system;
   (d) correction means for reading out the data associated with the full-aperture value and the position of the exit pupil, calculating a correction amount based on the readout data, and correcting the output from said light-receiving means based on the calculated correction amount; and
   (e) exposure control means for performing exposure control based on the corrected output.

2. A camera body according to claim 1, wherein when the calculated correction amount exceeds a predetermined value, said correction means sets the predetermined value as the correction amount.

3. A camera body according to claim 2, wherein said correction means checks if the calculated correction amount falls within a predetermined range defined by first and second predetermined values, and when the calculated correction amounts falls outside the predetermined range exceeding the first predetermined value, said correction means sets the first predetermined value as the correction amount, and when the calculated correction amount falls outside the predetermined range exceeding the second predetermined value, sets the second predetermined value as the correction amount.

4. A camera body according to claim 3, further comprising a pentagonal prism arranged between said optical member and said photometric optical system, and wherein said optical member comprises a finder screen.

5. A camera body to which a photographing lens storing data associated with a full-aperture value and data associated with a position of an exit pupil can be attached, including:
   (a) an optical member for scattering radiation from said photographing lens, said optical member being arranged on a side opposite to an object with respect to said photographing lens;
   (b) a plurality of light-receiving means for receiving radiation from a plurality of different regions of said optical member and generating outputs according to received radiation;
   (c) a plurality of correction means for reading out the data associated with the full-aperture value and the position of the exit pupil and correcting the plurality of outputs, respectively, said plurality of correction means calculating a plurality of correction amounts corresponding to the plurality of outputs based on the readout data, wherein at least one of said plurality of correction means selects one of a plurality of different functions in accordance with the data associated with the full-aperture value, and calculates the correction amount based on the selected function using the data associated with the position of the exit pupil, each of said different functions being an equation in which the correction amount is a function of the exit pupil distance; and (d) exposure control means for performing exposure control based on the plurality of corrected outputs.

6. A camera body according to claim 5, wherein when the calculated correction amount exceeds a predetermined value, said at least one correction means sets the predetermined value as the correction amount.

7. A camera body according to claim 6, wherein said at least one correction means checks if the calculated correction amount falls within a predetermined range defined by first and second predetermined values, and when the calculated correction amounts falls outside the predetermined range exceeding the first predetermined value, said correction means sets the first predetermined value as the correction amount, and when the calculated correction amount falls outside the predetermined range exceeding the second predetermined value, sets the second predetermined value as the correction amount.

8. A camera body according to claim 1, wherein said correction means selects one of a plurality of different functions in accordance with the data associated with the full-aperture value, and calculates the correction amount based on the selected function using the data associated with the position of the exit pupil.

9. A camera body according to claim 8, wherein each of the different functions is an equation in which the correction amount is a function of the exit pupil distance.

* * * * *